(12) United States Patent
Lee et al.

(10) Patent No.: US 10,323,728 B2
(45) Date of Patent: Jun. 18, 2019

(54) PLANETARY GEAR TRAIN OF AUTOMATIC TRANSMISSION FOR VEHICLES

(71) Applicants: HYUNDAI MOTOR COMPANY, Seoul (KR); KIA MOTORS CORPORATION, Seoul (KR)

(72) Inventors: Kyeong Hun Lee, Seoul (KR); Jong Sool Park, Hwaseong-si (KR); Jong Soo Kim, Seoul (KR); Dong Hwan Hwang, Seoul (KR); Jin Ho Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 27 days.

(21) Appl. No.: 15/788,233

(22) Filed: Oct. 19, 2017

(65) Prior Publication Data

US 2018/0363733 A1    Dec. 20, 2018

(30) Foreign Application Priority Data

Jun. 20, 2017    (KR) .......................... 10-2017-0077690

(51) Int. Cl.
*F16H 3/66* (2006.01)
*F16H 37/04* (2006.01)

(52) U.S. Cl.
CPC ............ *F16H 3/666* (2013.01); *F16H 37/04* (2013.01); *F16H 2037/048* (2013.01); *F16H 2200/006* (2013.01); *F16H 2200/2012* (2013.01); *F16H 2200/2043* (2013.01)

(58) Field of Classification Search
None
See application file for complete search history.

(56) References Cited

U.S. PATENT DOCUMENTS

| | | | | |
|---|---|---|---|---|
| 9,777,804 B2* | 10/2017 | Lee | ........................... | F16H 3/66 |
| 9,897,176 B2* | 2/2018 | Lee | ........................ | F16H 3/666 |
| 9,951,848 B2* | 4/2018 | Lee | ......................... | F16H 3/663 |
| 10,047,835 B2* | 8/2018 | Kim | ........................ | F16H 3/66 |
| 10,107,370 B1* | 10/2018 | Lee | ........................ | F16H 37/04 |
| 2017/0219057 A1* | 8/2017 | Lee | ........................... | F16H 3/66 |
| 2017/0219058 A1* | 8/2017 | Lee | ........................ | F16H 3/666 |
| 2017/0219065 A1* | 8/2017 | Lee | ........................ | F16H 3/663 |

(Continued)

*Primary Examiner* — Dirk Wright
(74) *Attorney, Agent, or Firm* — Brinks Gilson & Lione

(57) ABSTRACT

A planetary gear train of an automatic transmission for a vehicle provides at least eight forward speeds and one reverse speed by combination of: first to fourth planetary gear sets respectively having first to third rotational elements, fourth to sixth rotational elements, seventh to ninth rotational elements, or tenth to twelfth rotational elements; two transfer gears and five control elements selectively connecting one shaft to another shaft selected from first to tenth shafts or to a transmission housing. In particular, the input shaft is mounted with the first, second, and third planetary gear sets at an external circumference of the input shaft; the output shaft is mounted with the fourth planetary gear set on external circumference of the output shaft, and the tenth rotational element is externally gear-meshed with one shaft selectively connected with the second rotational element, the seventh rotational element, and the ninth rotational element respectively.

10 Claims, 2 Drawing Sheets

(56) References Cited

U.S. PATENT DOCUMENTS

Figure 1:
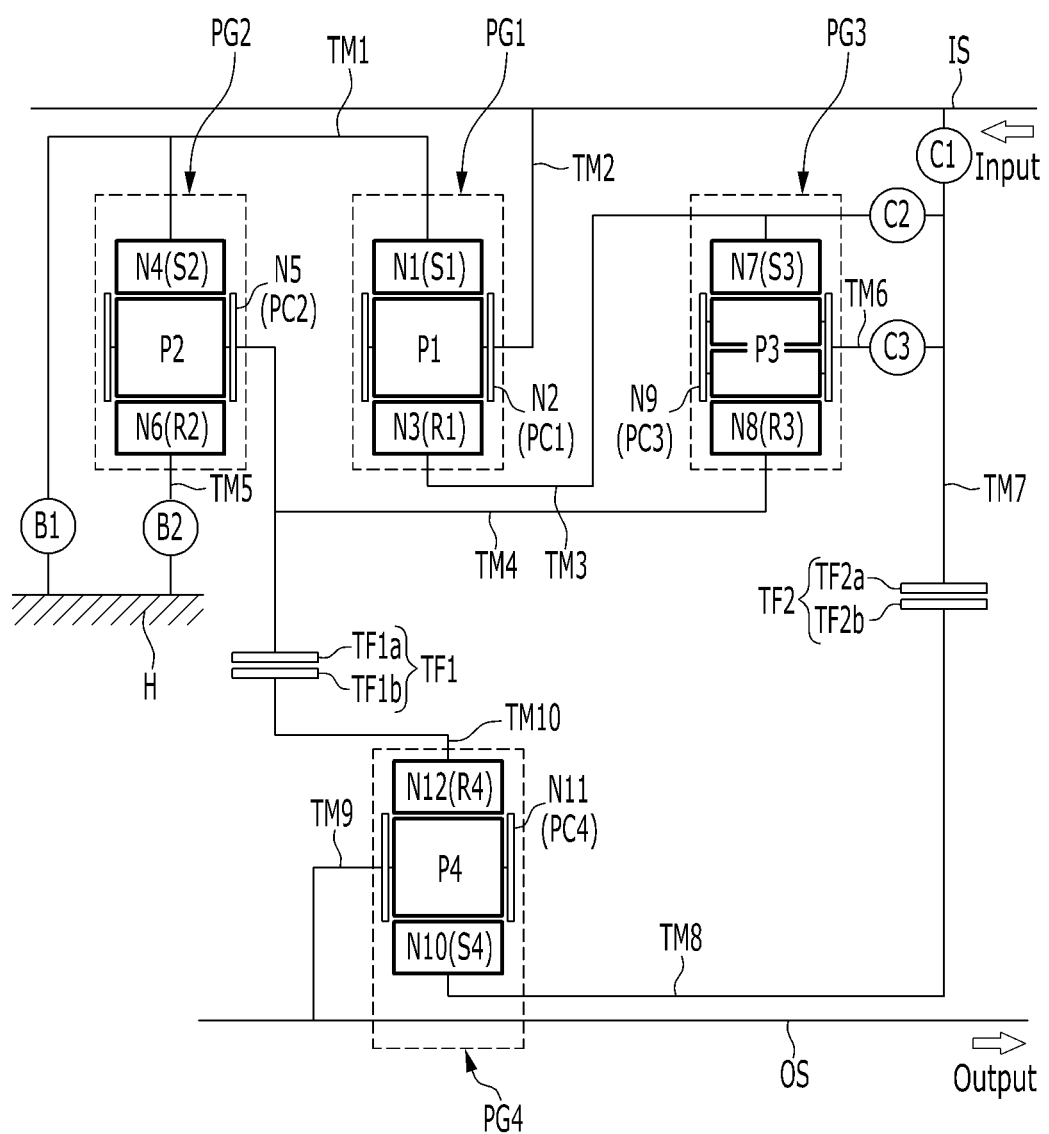

| | | | |
|---|---|---|---|
| 2017/0241518 A1* | 8/2017 | Kim | F16H 3/66 |
| 2017/0241519 A1* | 8/2017 | Kim | F16H 3/666 |
| 2018/0100568 A1* | 4/2018 | Kim | F16H 3/66 |
| 2018/0163824 A1* | 6/2018 | Kim | F16H 3/666 |
| 2018/0163825 A1* | 6/2018 | Kim | F16H 3/666 |
| 2018/0163831 A1* | 6/2018 | Kim | F16H 37/04 |
| 2018/0306289 A1* | 10/2018 | Lee | F16H 37/04 |
| 2018/0306290 A1* | 10/2018 | Lee | F16H 37/04 |
| 2018/0306291 A1* | 10/2018 | Lee | F16H 37/04 |
| 2018/0363734 A1* | 12/2018 | Lee | F16H 3/666 |
| 2019/0011028 A1* | 1/2019 | Lee | F16H 37/04 |

* cited by examiner

FIG. 2

| Shift-stage | Clutch | | | Brake | | Gear ratio | Step ratio | Remark |
|---|---|---|---|---|---|---|---|---|
| | C1 | C2 | C3 | B1 | B2 | | | |
| REV | | | ● | ● | ● | -3.925 | - | Gear ratio span : 8.72<br><br>Ratio of REV vs D1 : -0.71 |
| N | | | | ● | ● | - | - | |
| D1 | ● | | | ● | ● | 5.530 | - | |
| D2 | | ● | | ● | ● | 3.504 | 1.578 | |
| D3 | ● | ● | | | ● | 2.289 | 1.531 | |
| D4 | | ● | ● | | ● | 1.806 | 1.267 | |
| D5 | ● | | ● | | ● | 1.356 | 1.332 | |
| D6 | ● | ● | ● | | | 1.000 | 1.356 | |
| D7 | ● | | ● | ● | | 0.817 | 1.224 | |
| D8 | | ● | ● | ● | | 0.634 | 1.289 | |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0077690, filed on Jun. 20, 2017, which is incorporated herein by reference in its entirety.

FIELD

The present disclosure relates to an automatic transmission for a vehicle. More particularly, the present disclosure relates to a planetary gear train of an automatic transmission of a vehicle that improves power delivery performance, reduces fuel consumption, and improves installability.

BACKGROUND

The statements in this section merely provide background information related to the present disclosure and may not constitute prior art.

Recently, increase of oil price triggered a more competition than before to enhance fuel efficiency of a vehicle.

In this sense, research on an automatic transmission has been performed to simultaneously provide better drivability and fuel consumption by achieving more shift stages.

In order to achieve more shift stages for an automatic transmission, the number of parts is typically increased. This negatively affects installability, production cost, weight and/or power flow efficiency.

An automatic transmission providing eight or more shift-stages may easily become lengthy due to increased components, thereby deteriorating installability.

In this regard, disposing planetary gear sets in parallel or employing dog clutches instead of wet-type control elements is sometimes attempted. However, we have discovered that such an arrangement may not be widely applicable, and using dog clutches may easily deteriorate shift-feeling.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle having advantages of realizing eight forward speeds and one reverse speed by a combination of four planetary gear sets, two external gears and five control elements, thereby providing improvement of power delivery performance and fuel consumption and improving installability by reducing a length.

In addition, a wide available range of varying gear teeth of transfer gears enables easily obtaining desired gear ratios for respective vehicles, thereby improving power delivery performance and fuel consumption.

In one form of the present disclosure, a planetary gear train may include: a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; an input shaft mounted with the first, second, and third planetary gear sets at an external circumference of the input shaft; and an output shaft disposed in parallel with the input shaft and mounted with the fourth planetary gear set on external circumference of the output shaft, wherein the first rotational element is fixedly connected with the fourth rotational element, the second rotational element is fixedly connected with the input shaft, the third rotational element is fixedly connected with the seventh rotational element, the fifth rotational element is fixedly connected with the eighth rotational element, the tenth rotational element is externally gear-meshed with one shaft selectively connected with the second rotational element, the seventh rotational element, and the ninth rotational element respectively, the eleventh rotational element is fixedly connected with the output shaft, the twelfth rotational element is externally gear-meshed with the fifth rotational element, and first and second transfer gear units.

The first transfer gear unit is externally gear-meshed with at least two shafts fixedly connected with the fifth rotational element and the twelfth rotational element, respectively, and the second transfer gear unit is externally gear-meshed with at least two shafts fixedly connected with the one shaft and tenth rotational element, respectively.

The fourth rotational element and the sixth rotational element may be selectively connected with a transmission housing respectively.

An exemplary gear train may further include a first clutch selectively connected with the second rotational element and the one shaft; a second clutch selectively connected with the seventh rotational element and the one shaft; a third clutch selectively connected with the ninth rotational element and the one shaft; a first brake selectively connected with the fourth rotational element and the transmission housing; and a second brake selectively connected with the sixth rotational element and the transmission housing.

The first transfer gear unit is arranged between the fifth rotational element and the twelfth rotational element; and the second transfer gear unit is arranged between the one shaft and the tenth rotational element.

The first planetary gear set may include a first sun gear as the first rotational element, a first planet carrier as the second rotational element, and a first ring gear as the third rotational element. The second planetary gear set may include a second sun gear as the fourth rotational element, a second planet carrier as the fifth rotational element, and a second ring gear as the sixth rotational element. The third planetary gear set may include a third sun gear as the seventh rotational element, a third planet carrier as the eighth rotational element, and a third ring gear as the ninth rotational element. The fourth planetary gear set may include a fourth sun gear as the tenth rotational element, a fourth planet carrier as the eleventh rotational element, and a fourth ring gear as the twelfth rotational element.

According to a planetary gear train according to an exemplary form of the present disclosure, planetary gear sets are dividedly arranged on input and output shafts disposed in parallel, thereby reducing a total length of the transmission and improving its installability.

According to a planetary gear train according to an exemplary form of the present disclosure, at least eight forward speeds and at least one reverse speed may be realized by employing two transfer gears in addition to a combination of planetary gear sets, thereby providing a wide range of varying gear teeth so as to easily achieve desired gear ratio and to easily comply with desired performance for respective vehicles.

In addition, according to a planetary gear train according to an exemplary form of the present disclosure, a gear ratio span greater than 8.7 may be achieved while realizing eight forward speeds and one reverse speed, thereby increasing an engine driving efficiency.

In addition, the linearity of step ratios of shift stages is secured while multi-staging the shift stage with high efficiency, thereby making it possible to improve drivability such as acceleration before and after a gear shift, an engine speed rhythmic sense, and the like.

In addition, the material cost can be reduced by applying the five control elements, and the drag loss can be reduced and the transmission efficiency (fuel economy) can be increased by reducing the non-operating control element at each gear range.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a planetary gear train according to an exemplary form of the present disclosure; and FIG. 2 is an operational chart for respective control elements at respective shift-stages in a planetary gear train according to an exemplary form of the present disclosure.

The drawings described herein are for illustration purposes only and are not intended to limit the scope of the present disclosure in any way.

DETAILED DESCRIPTION

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Here, the term "fixedly connected" or the like means at least two members are connected to each other to always rotate together. Therefore, it is to be understood by a person of an ordinary skill in the art that the term "fixedly connected" or the like differs from the term "operably connected" or the like.

FIG. 1 is a schematic diagram of a planetary gear train in one exemplary form of the present disclosure.

Referring to FIG. 1, a planetary gear train includes: an input shaft IS; an output shaft OS; first, second, third, and fourth planetary gear sets PG1, PG2, PG3, and PG4; two transfer gears TF1 and TF2; and control elements including three clutches C1, C2, and C3 and two brakes B1 and B2.

The input shaft IS is an input member and the torque from a crankshaft of an engine is input into the input shaft IS, after being torque-converted through a torque converter.

The output shaft OS is an output member, and arranged in parallel with the input shaft IS so as to output a shifted driving torque to a drive shaft through a differential apparatus.

The first, second, and third planetary gear sets PG1, PG2, and PG3 are arranged at external circumference of the input shaft IS and form a main shifting portion, and are arranged in the order of third, first, and second planetary gear sets PG3, PG1, and PG2 from an engine side.

The fourth planetary gear set PG4 is arranged at external circumference of the output shaft OS disposed in parallel with the input shaft IS and forms an auxiliary shifting portion.

The first planetary gear set PG1 is a single pinion planetary gear set, and includes a first sun gear S1, a first planet carrier PC1 that supports first pinion P1 externally engaged with the first sun gear S1, and a first ring gear R1 that is internally engaged with the first pinion P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports second pinion P2 externally engaged with the second sun gear S2, and a second ring gear R2 that is internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a double pinion planetary gear set, and includes a third sun gear S3, a third planet carrier PC3 that is internally gear-meshed with a third pinion P3 externally gear-meshed with the third sun gear S3, and a third planet carrier PC3 that supports the third pinion P3. The third sun gear S4 acts as a seventh rotational element N7, the third ring gear R3 acts as an eighth rotational element N8, and the third planet carrier PC3 acts as a ninth rotational element N9.

The fourth planetary gear set PG4 is a single pinion planetary gear set, and includes a fourth sun gear S4, a fourth ring gear R4 that supports fourth pinion P4 externally engaged with the fourth sun gear S4, and a fourth ring gear R4 that is internally engaged with the fourth pinion P4. The fourth sun gear S4 acts as a tenth rotational element N10, the fourth ring gear R4 acts as an eleventh rotational element N11, and the fourth planet carrier PC4 acts as a twelfth rotational element N12.

In the arrangement of the first, second, and third planetary gear sets PG1, PG2, and PG3, the first rotational element N1 is fixedly connected with the fourth rotational element N4, the third rotational element N3 is fixedly connected with the seventh rotational element N7, and the fifth rotational element N5 is fixedly connected with the eighth rotational element N8, by a corresponding shaft selected from seven shaft TM1 to TM7.

Three shafts TM8 to TM10 are connected to the fourth planetary gear set PG4.

The ten shafts TM1 to TM10 are hereinafter described in detail.

The first shaft TM1 is fixedly connected with the first rotational element N1 (first sun gear S1) and the fourth rotational element N4 (second sun gear S2), and is selectively connected with a transmission housing H thereby selectively acting as a fixed element.

The second shaft TM2 is fixedly connected with the second rotational element N2 (first planet carrier PC1), and is fixedly connected with the input shaft IS thereby always acting as an input element.

The third shaft TM3 is fixedly connected with the third rotational element N3 (first ring gear R1) and the seventh rotational element N7 (third sun gear S3).

The fourth TM4 is fixedly connected with the fifth rotational element N5 (second planet carrier PC2) and the eighth rotational element N8 (third ring gear R3).

The fifth shaft TM5 is fixedly connected with the sixth rotational element N6 (second ring gear R2), and is selectively connected with the transmission housing H thereby selectively acting as a fixed element.

The sixth shaft TM6 is fixedly connected with the ninth rotational element N9 (third planet carrier PC3).

The seventh shaft TM7 consists of a single rotating member, and is selectively connected with the second, third, and sixth shaft TM2, TM3 and TM6 respectively.

The eighth shaft TM8 is fixedly connected with the tenth rotational element N10 (fourth sun gear S4), and externally gear-meshed with the seventh shaft TM7.

The ninth shaft TM9 is fixedly connected with the eleventh rotational element N11 (fourth planet carrier PC4), and is fixedly connected with the output shaft OS thereby always acting as an output element.

The tenth shaft TM10 is fixedly connected with the twelfth rotational element N12 (fourth ring gear R4), externally gear-meshed with the fourth shaft TM4.

The two transfer gears TF1 and TF2 delivers a shifted torque of the main shifting portion having the first, second, and third planetary gear sets PG1, PG2, and PG3 to the auxiliary shifting portion having the fourth planetary gear set PG4, in a reverse rotation.

The first transfer gear TF1 includes a first transfer drive gear TF1a fixedly connected with the fourth shaft TM4 and a first transfer driven gear TF1b connected with the tenth shaft TM10, and externally gear-meshes the fourth shaft TM4 and the tenth shaft TM10.

The second transfer gear TF2 includes a second transfer drive gear TF2a fixedly connected with the seventh shaft TM7 and a second transfer driven gear TF2b fixedly connected with the eighth shaft TM8, and externally gear-meshes the seventh shaft TM7 and the eighth shaft TM8.

Respective shafts connected by the first and second transfer gears TF1 and TF2 rotate in opposite directions, and the gear ratios of the first and second transfer gears TF1 and TF2 may be preset in consideration of desired speed ratio of the transmission.

Here, each of the ten shafts TM1 to TM10 may be a rotational member that fixedly connects the input and output shafts and rotational elements of the planetary gear sets PG1, PG2, PG3, and PG4, or may be a rotated members that selectively connect the rotational elements to the transmission housing H, or may be a fixed members that fix the rotational elements to the transmission housing H.

In addition, in the above description, the term "fixedly connected" or similar term means that a plurality of rotational elements including the input and output shafts, which are connected through the corresponding shafts, and the corresponding shaft are connected so as to always rotate together such that a plurality of fixedly connected rotational elements and corresponding shafts may rotate in the same rotation direction and/or same number of revolutions.

In addition, in the above description, the term "selectively connected" or similar terms means that a plurality of shafts, including an input and output shafts, are connected to each other through a coupling element, or the corresponding shaft is fixedly connected to the transmission housing via a coupling element. Once connected, the connected shafts and/or rotation elements may rotate in the same rotation direction and/or same number of revolutions.

For example, when the coupling element operates to selectively connect two shafts to each other, the two shafts may rotate in the same rotation direction with the same number of revolutions (i.e., same rotation speed). Conversely, when the coupling element is released, the connection of the two shafts is released.

Further, when the coupling element operates to selectively connect the corresponding shaft and the transmission housing, the corresponding shaft is fixedly connected to the transmission housing. Conversely, when the coupling element is released, the corresponding shaft is in a rotatable state.

The control elements include three clutches C1, C2, and C3 and two brakes B1 and B2, and are arranged as follows.

The first clutch C1 is arranged between the second shaft TM2 and the seventh shaft TM7, such that the second shaft TM2 and the seventh shaft TM7 may selectively become integral.

The second clutch C2 is arranged between the third shaft TM3 and the seventh shaft TM7, such that the third shaft TM3 and the seventh shaft TM7 may selectively become integral.

The third clutch C3 is arranged between the sixth shaft TM6 and the seventh TM7, such that the sixth shaft TM6 and the seventh TM7 may selectively become integral.

The first brake B1 is arranged between the first shaft TM1 and the transmission housing H, such that the first shaft TM1 may selectively act as a fixed element.

The second brake B2 is arranged between the fifth shaft TM5 and the transmission housing H, such that the fifth shaft TM5 may selectively act as a fixed element.

The respective control elements of the first, second, and third clutches C1, C2, and C3 and the first and second brakes B1 and B2 may be realized as multi-plate hydraulic pressure friction devices that are frictionally engaged by hydraulic pressure. Meanwhile, the control element is any of a dog clutch, an electric clutch, and a magnetic particle clutch, the like which may be automatically controlled, and may be adopted.

FIG. 2 is an operational chart for respective control elements at respective shift-stages in a planetary gear train according to an exemplary form of the present disclosure.

Referring to FIG. 2, a planetary gear train realizes shifting by operating three control elements among the three clutches C1, C2, and C3 and the two brakes B1 and B2.

[The Forward First Speed]

In the forward first speed shift-stage D1, the first clutch C1 and the first and second brakes B1 and B2 are simultaneously operated.

As a result, the second shaft TM2 is connected with the seventh shaft TM7 by the operation of the first clutch C1. In this state, the torque of the input shaft IS is simultaneously input to the second and seventh shafts TM2 and TM7, and the first and fifth shafts TM1 and TM5 act as fixed elements by the operation of the first and second brakes B1 and B2, thereby realizing the forward first speed by cooperative operation of respective shafts and outputting a shifted torque to the output shaft OS fixedly connected with the ninth shaft TM9.

[The Forward Second Speed]

In the forward second speed shift-stage D2, the second clutch C2 and the first and second brakes B1 and B2 are simultaneously operated.

As a result, the third shaft TM3 is connected with the seventh shaft TM7 by the operation of the second clutch C2. In this state, the torque of the input shaft IS is input to the second shaft TM2, and the first and fifth shafts TM1 and TM5 act as fixed elements by the operation of the first and second brakes B1 and B2, thereby realizing the forward second speed by cooperative operation of respective shafts and outputting a shifted torque to the output shaft OS fixedly connected with the ninth shaft TM9.

[The Forward Third Speed]

In the forward third speed shift-stage D3, the first and second clutches C1 and C2 and the second brake B2 are simultaneously operated.

As a result, the second shaft TM2 is connected with the seventh shaft TM7 by the operation of the first clutch C1, and the third shaft TM3 is connected with the seventh shaft TM7 by the operation of the second clutch C2. In this state, the torque of the input shaft IS is simultaneously input to the second and seventh shafts TM2 and TM7, and the fifth shaft TM5 acts as a fixed element by the operation of the second brake B2, thereby realizing the forward third speed by cooperative operation of respective shafts and outputting a shifted torque to the output shaft OS fixedly connected with the ninth shaft TM9.

[The Forward Fourth Speed]

In the forward fourth speed shift-stage D4, the second and third first clutch C2 and C3 and the second brake B2 are simultaneously operated.

As a result, the third shaft TM3 is connected with the seventh shaft TM7 by the operation of the second clutch C2, and the sixth shaft TM6 is connected with the seventh shaft TM7 by the operation of the third clutch C3. In this state, the torque of the input shaft IS is input to the second shaft TM2, and the fifth shaft TM5 acts as a fixed element by the operation of the second brake B2, thereby realizing the forward fourth speed by cooperative operation of respective shafts and outputting a shifted torque to the output shaft OS fixedly connected with the ninth shaft TM9.

[The Forward Fifth Speed]

In the forward fifth speed shift-stage D5, the first and third clutches C1 and C3 and the second brake B2 are simultaneously operated.

As a result, the second shaft TM2 is connected with the seventh shaft TM7 by the operation of the first clutch C1, and the sixth shaft TM6 is connected with the seventh shaft TM7 by the operation of the third clutch C3. In this state, the torque of the input shaft IS is simultaneously input to the second and seventh shafts TM2 and TM7, and the fifth shaft TM5 acts as a fixed element by the operation of the second brake B2, thereby realizing the forward fifth speed by cooperative operation of respective shafts and outputting a shifted torque to the output shaft OS fixedly connected with the ninth shaft TM9.

[The Forward Sixth Speed]

In the forward sixth speed shift-stage D6, the first, second, and third clutches C1, C2, and C3 are simultaneously operated.

As a result, the second shaft TM2 is connected with the seventh shaft TM7 by the operation of the first clutch C1, the third shaft TM3 is connected with the seventh shaft TM7 by the operation of the second clutch C2, and the sixth shaft TM6 is connected with the seventh shaft TM7 by the operation of the third clutch C3. In this state, the torque of the input shaft IS is simultaneously input to the second and seventh shafts TM2 and TM7, thereby realizing the forward sixth speed that outputs a torque as inputted, by cooperative operation of respective shafts and outputting a shifted torque to the output shaft OS fixedly connected with the ninth shaft TM9.

[The Forward Seventh Speed]

In the forward seventh speed shift-stage D7, the first and third clutches C1 and C3 and the first brake B1 are simultaneously operated.

As a result, the second shaft TM2 is connected with the seventh shaft TM7 by the operation of the first clutch C1, and the sixth shaft TM6 is connected with the seventh shaft TM7 by the operation of the third clutch C3. In this state, the torque of the input shaft IS is simultaneously input to the second and seventh shafts TM2 and TM7, and the first shaft TM1 acts as a fixed element by the operation of the first brake B1, thereby realizing the forward seventh speed by cooperative operation of respective shafts and outputting a shifted torque to the output shaft OS fixedly connected with the ninth shaft TM9.

[The Forward Eighth Speed]

In the forward eighth speed shift-stage D8, the second and third clutches C2 and C3 and the first brake B1 are simultaneously operated.

As a result, the third shaft TM3 is connected with the seventh shaft TM7 by the operation of the second clutch C2, and the sixth shaft TM6 is connected with the seventh shaft TM7 by the operation of the third clutch C3. In this state, the torque of the input shaft IS is input to the second shaft TM2, and the first shaft TM1 acts as a fixed element by the operation of the first brake B1, thereby realizing the forward eighth speed by cooperative operation of respective shafts and outputting a shifted torque to the output shaft OS fixedly connected with the ninth shaft TM9.

[The Reverse Speed]

In the reverse speed, the third clutch C3 and first and second brakes B1 and B2 are simultaneously operated.

As a result, the sixth shaft TM6 is connected with the seventh shaft TM7 by the operation of the third clutch C3. In this state, the torque of the input shaft IS is input to the second shaft TM2, and the first and fifth shafts TM1 and TM5 act as a fixed element by the operation of the first and second brakes B1 and B2, thereby realizing the reverse speed by cooperative operation of respective shafts and outputting a shifted torque to the output shaft OS fixedly connected with the ninth shaft TM9.

As described above, according to a planetary gear train according to an exemplary form of the present disclosure, eight forward speeds and one reverse speed may be realized by a combination of four planetary gear sets PG1, PG2, PG3, and PG4, two transfer gears TF1 and TF2, and five control elements, thereby providing improvement of power delivery performance and fuel consumption and improving installability by shortening the length of an automatic transmission.

In addition, according to a planetary gear train according to an exemplary form of the present disclosure, two transfer gears of external gears arranged on the output shaft OS are employed in addition to three planetary gear sets, and thus, gear teeth may be widely varied so as to easily achieve desired gear ratio and to easily comply with desired performance for respective vehicles.

In addition, according to a planetary gear train according to an exemplary form of the present disclosure, a gear ratio span greater than 8.7 may be achieved while realizing eight forward speeds and one reverse speed, thereby increasing an engine driving efficiency.

In addition, the linearity of step ratios of shift stages is secured while multi-staging the shift stage with high efficiency, thereby making it possible to improve drivability such as acceleration before and after a gear shift, an engine speed rhythmic sense, and the like.

In addition, the material cost can be reduced by applying the five control elements, and the drag loss can be reduced and the transmission efficiency (fuel economy) can be increased by reducing the non-operating control element at each gear range.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

PG1,PG2,PG3,PG4 . . . first, second, third, and fourth planetary gear sets
S1,S2,S3,S4 . . . first, second, third, and fourth sun gears
PC1,PC2,PC3,PC4 . . . first, second, third, and fourth planet carriers
R1,R2,R3,R4 . . . first, second, third, and fourth ring gears
IS . . . input shaft
OS . . . output shaft
B1,B2 . . . first, and second third brakes
C1,C2,C3 . . . first, second, and third clutches
TF1,TF2 . . . first and second transfer gears
TM1,TM2,TM3,TM4,TM5,TM6,TM7,TM8,TM9, TM10 . . . first, second, third, fourth, fifth, sixth, seventh, eighth, ninth, and tenth shaft

What is claimed is:

1. A planetary gear train of an automatic transmission for a vehicle, the planetary gear train comprising:
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   an input shaft mounted with the first, second, and third planetary gear sets at an external circumference of the input shaft; and
   an output shaft disposed in parallel with the input shaft and mounted with the fourth planetary gear set on external circumference of the output shaft,
   wherein the first rotational element is fixedly connected with the fourth rotational element,
   the second rotational element is fixedly connected with the input shaft,
   the third rotational element is fixedly connected with the seventh rotational element,
   the fifth rotational element is fixedly connected with the eighth rotational element,
   the tenth rotational element is externally gear-meshed with one shaft selectively connected with the second rotational element, the seventh rotational element, and the ninth rotational element respectively,
   the eleventh rotational element is fixedly connected with the output shaft,
   the twelfth rotational element is externally gear-meshed with the fifth rotational element, and
   first and second transfer gear units, wherein the first transfer gear unit is externally gear-meshed with at least two shafts respectively and fixedly connected with the fifth rotational element and the twelfth rotational element, and the second transfer gear unit is externally gear-meshed with at least two shafts respectively and externally gear-meshed with the one shaft and tenth rotational element.

2. The planetary gear train of claim 1, wherein the fourth rotational element and the sixth rotational element are selectively connected with a transmission housing respectively.

3. The planetary gear train of claim 2, further comprising:
   a first clutch selectively connected with the second rotational element and the one shaft;
   a second clutch selectively connected with the seventh rotational element and the one shaft;
   a third clutch selectively connected with the ninth rotational element and the one shaft;
   a first brake selectively connected with the fourth rotational element and the transmission housing; and
   a second brake selectively connected with the sixth rotational element and the transmission housing.

4. The planetary gear train of claim 1, wherein the first transfer gear unit is arranged between the fifth rotational element and the twelfth rotational element; and
   the second transfer gear unit is arranged between the one shaft and the tenth rotational element.

5. The planetary gear train of claim 1, wherein the first planetary gear set comprises a first sun gear as the first rotational element, a first planet carrier as the second rotational element, and a first ring gear as the third rotational element;
   the second planetary gear set comprises a second sun gear as the fourth rotational element, a second planet carrier as the fifth rotational element, and a second ring gear as the sixth rotational element;
   the third planetary gear set comprises a third sun gear as the seventh rotational element, a third planet carrier as the eighth rotational element, and a third ring gear as the ninth rotational element; and
   the fourth planetary gear set comprises a fourth sun gear as the tenth rotational element, a fourth planet carrier as the eleventh rotational element, and a fourth ring gear as the twelfth rotational element.

6. A planetary gear train of an automatic transmission for a vehicle, the planetary gear train comprising:
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   an input shaft mounted with the first, second, and third planetary gear sets at an external circumference of the input shaft; and an output shaft disposed in parallel with the input shaft and mounted with the fourth planetary gear set on external circumference of the output shaft;

a first shaft fixedly connected with the first rotational element and the fourth rotational element;

a second shaft fixedly connected with the second rotational element and the input shaft;

a third shaft fixedly connected with the third rotational element and the seventh rotational element;

a fourth shaft fixedly connected with the fifth rotational element and the eighth rotational element;

a fifth shaft fixedly connected with the sixth rotational element;

a sixth shaft fixedly connected with the ninth rotational element;

a seventh shaft selectively connected with the second, third, and sixth shafts respectively;

an eighth shaft fixedly connected with the tenth rotational element, and externally gear-meshed with the seventh shaft;

a ninth shaft fixedly connected with the eleventh rotational element and the output shaft;

a tenth shaft fixedly connected with the twelfth rotational element, and externally gear-meshed with the fourth shaft; and first and second transfer gear units, wherein the first transfer gear unit is externally gear-meshed with the fourth shaft and the tenth shaft, and the second transfer gear unit is externally gear-meshed with the seventh shaft and the eighth shaft.

7. The planetary gear train of claim 6, wherein
the seventh shaft is selectively connected with the second, third, and sixth shafts respectively, and
the first shaft and the fifth shaft are selectively connected with a transmission housing respectively.

8. The planetary gear train of claim 7, further comprising:
a first clutch arranged between the second shaft and the seventh shaft;
a second clutch arranged between the third shaft and the seventh shaft;
a third clutch arranged between the sixth shaft and the seventh shaft;
a first brake arranged between the first shaft and the transmission housing; and
a second brake arranged between the fifth shaft and the transmission housing.

9. The planetary gear train of claim 6, wherein
the first transfer gear unit is arranged between the fourth shaft and the tenth shaft; and
the second transfer gear unit is arranged between the seventh shaft and the eighth shaft.

10. The planetary gear train of claim 6, wherein
the first planetary gear set comprises a first sun gear as the first rotational element, a first planet carrier as the second rotational element, and a first ring gear as the third rotational element;
the second planetary gear set comprises a second sun gear as the fourth rotational element, a second planet carrier as the fifth rotational element, and a second ring gear as the sixth rotational element;
the third planetary gear set comprises a third sun gear as the seventh rotational element, a third planet carrier as the eighth rotational element, and a third ring gear as the ninth rotational element; and
the fourth planetary gear set comprises a fourth sun gear as the tenth rotational element, a fourth planet carrier as the eleventh rotational element, and a fourth ring gear as the twelfth rotational element.

\* \* \* \* \*